United States Patent [19]
Luzio et al.

[11] Patent Number: 6,165,534
[45] Date of Patent: *Dec. 26, 2000

[54] FOOD COMPOSITIONS

[75] Inventors: Gary Andrew Luzio, Newark; Anne Elizabeth Tieleman, Wilmington, both of Del.

[73] Assignee: Hercules Incorporated, Wilmington, Del.

[*] Notice: This patent is subject to a terminal disclaimer.

[21] Appl. No.: 08/317,819

[22] Filed: Oct. 4, 1994

[51] Int. Cl.[7] ....................................................... A23D 7/00
[52] U.S. Cl. ......................... 426/573; 426/601; 426/602; 426/603
[58] Field of Search ................................... 426/601, 602, 426/573, 603

[56] References Cited

U.S. PATENT DOCUMENTS

| | | |
|---|---|---|
| 279,150 | 5/1957 | Rivoche . |
| 2,036,922 | 1/1935 | Clark et al. . |
| 2,786,763 | 1/1953 | Rivoche . |
| 2,859,115 | 11/1958 | Rivoche . |
| 3,023,104 | 2/1962 | Battista et al. . |
| 3,573,058 | 3/1971 | Tiemstra . |
| 3,764,707 | 10/1973 | Habersberger . |
| 4,263,334 | 4/1981 | McGinley . |
| 4,305,970 | 12/1981 | Moran et al. . |
| 4,389,426 | 6/1983 | Reissmann et al. . |
| 4,828,396 | 5/1989 | Singer et al. . |
| 4,844,922 | 7/1989 | Uemura et al. . |
| 4,882,187 | 11/1989 | Izzo et al. . |
| 4,911,946 | 3/1990 | Singer et al. . |
| 4,917,915 | 4/1990 | Cain et al. . |
| 4,956,193 | 9/1990 | Cain et al. . |
| 4,985,250 | 1/1991 | Bee et al. . |
| 5,011,701 | 4/1991 | Baer et al. . |
| 5,100,688 | 3/1992 | Cox et al. . |
| 5,133,979 | 7/1992 | Clarke et al. . |
| 5,153,020 | 10/1992 | Singer et al. . |
| 5,244,688 | 9/1993 | Norton . |
| 5,279,844 | 1/1994 | Wesdorp et al. . |
| 5,464,645 | 11/1995 | Wesdorp ................................. 426/603 |
| 5,501,869 | 3/1996 | Buliga .................................... 426/603 |
| 5,508,056 | 4/1996 | Norton .................................... 426/602 |
| 5,536,523 | 7/1996 | Blavel .................................... 426/602 |
| 5,554,407 | 9/1996 | Bodor ..................................... 426/602 |
| 5,659,000 | 8/1997 | Cain ....................................... 426/602 |
| 5,837,307 | 11/1998 | Bodor ..................................... 426/603 |

FOREIGN PATENT DOCUMENTS

| | | |
|---|---|---|
| 40452 | 10/1978 | Australia . |
| 0355908 | 2/1990 | European Pat. Off. . |
| 0432835 | 6/1991 | European Pat. Off. . |
| 0437360 | 7/1991 | European Pat. Off. . |
| 0501758 | 9/1992 | European Pat. Off. . |
| 0547647 | 6/1993 | European Pat. Off. . |
| 0558113 | 9/1993 | European Pat. Off. . |
| 63 139108 | 2/1990 | Japan . |
| 89/12403 | 12/1989 | WIPO . |
| 91/19424 | 12/1991 | WIPO . |

OTHER PUBLICATIONS

Postmus 1989 Composition & Physical Properties of North American Stick Margarines Can. Inst. Food Sci. Tech. J 22(5)481–486.

De Man 1991 Composition, physical and textural characteristics of soft (tub) margarines JAOCS 68(2) 70–73.

Swern 1982 Baileys Industrial Oil and Fat Products vol. 2 4th edition John Wiley & Sons, New York p 427.

Gunstone 1983 Lipids in Foods Chemistry, Biochemistry and Technology Pergamon Press Oxford p 154.

Thom et al., "Interchain Associations of Alginate and Pectins," *Prog. Ed. Nutr. Sci.*, vol. 6 (1982), pp. 97–108.

Hercules Incorporated, Natures Simple Solution to Fat Replacement . . . SLENDID™, 1991, pp. 1–10.

Hercules Incorporated, News Release, "New, Natural Fat Replacer Introduced," Sep. 23, 1991.

"Buttering Up Customers for Margarine," *Wall Street Journal*, Jun. 6, 1994.

"What to Spread on Bread," *Consumer Reports*, May, 1994, pp. 304–308.

Brinkman Instruments, Inc. Brinkman Particle Size Analyzer, 1991, pp. 1–12.

Primary Examiner—Carolyn Paden
Attorney, Agent, or Firm—Mark D. Kuller; David Edwards; James Cairns

[57] ABSTRACT

A food composition having a softening point of at least about 115° F., and composed of an emulsion and a chemically set gel. The emulsion is prepared from water and a fat; the chemically set gel is prepared from a carbohydrate and water.

57 Claims, 2 Drawing Sheets

FOOD COMPOSITIONS

BACKGROUND OF THE INVENTION

1. Field of the Invention

The present invention relates to food compositions, including edible spreads, and to their preparation.

2. Description of Background and Other Information

In commercially available full fat edible spreads, the fats are provided as part of water in oil emulsions, with the fat representing the oil phase. The low fat and nonfat spreads, however, are generally blends of fats and aqueous gelatin phases.

In full fat spreads, which typically contain 80% or more fat, water is a minor component, and, accordingly, water release in foods is not a problem. However, in the effort to reduce the fat content of edible spreads, a point is ultimately reached at which there is no longer sufficient fat to maintain a stable water in oil emulsion under varying use conditions.

Accordingly, in the commercially available low fat and nonfat spreads, gelatin is substituted for the fat, to hold the water in place, to improve the body of the spreads, and to provide the desired melting characteristics. It has been common practice to use gelatin that melts slightly below body temperature, i.e., less than 100° F., as this was thought to impart desired melting characteristics to the spreads.

However, melting characteristics of gelatin based spreads can result in undesirable properties. Two such properties are water release and phase separation.

As to the first property, at the melting point of the gelatin a low viscosity aqueous solution is formed and will accordingly flow into a hot food item to which the spread is applied. Hot food items such as baked potatoes and toast effect such a result; where the food absorbs water, a water soaked product ensues—e.g., soggy toast, which is universally considered unpalatable.

Regarding the second property, melting of the gelatin can also cause phase separation of the spread. The result is aesthetically unpleasant, with solid white deposits appearing on food to which the spread is applied.

These undesirable properties of low fat and nonfat spreads are noted, for example, in the articles "Butter spreading up Customers for Margarine", *Wall Street Journal,* Jun. 6, 1994, and "What to Spread on Bread", *Consumer Reports,* May, 1994, pp. 304–308.

Therefore, the need arises to provide a composition—especially a food composition, and most particularly an edible spread—which overcomes the above noted disadvantages, and is characterized by the requisite functional and aesthetic properties at refrigerated and room temperatures, as well as at elevated temperatures. In this regard, there is particularly a need for such a composition which remains stable even when in contact with hot food items.

As a further matter, it has generally been thought that the softening point of the spread as an whole must be at least slightly below body temperature, in order for the spread to be suitable for its intended function. For instance, U.S. Pat. No. 4,882,187 discloses an edible spread which incorporates a gelatin gel having a melting point of less than 98.6° F., because melting of the gel in the mouth will cause the product as perceived in the mouth to become thinner.

However, there have now been provided edible spreads which—in contrast to those of the prior art—do not soften at a point below body temperature, but rather have softening points of about 115° F. or higher.

SUMMARY OF THE INVENTION

The present invention relates to compositions—especially food compositions, and most particularly edible spreads—which retain their stability at elevated temperatures, particularly those at which hot foods are customarily served.

It has been discovered that food compositions—particularly, edible spreads—comprised of (1) a chemically set gel (gum fraction) which is preferably also heat stable, and (2) an emulsion of fat and water (fat fraction) avoid the foregoing shortcomings. Particularly, at the elevated temperatures at which toast, baked potatoes, and other hot food items are customarily served, these compositions are characterized by inhibited water release.

It has further been discovered that the food compositions of the invention exhibit excellent spreadability and mouthfeel. Though their stability (as indicated) is maintained, they exhibit soft texture at temperatures slightly in excess of room temperature; this is a property which is desirable in mimicking the behavior of full fat spreads. However, even with this soft texture the heat stable gum fraction remains intact—thereby inhibiting water release and mimicking the appearance of a melting fat fraction. Moreover, the perception of melting fat is enhanced, because no undesirable opaque solid residue remains on the food surface after heating, as occurs with the commercial low fat and nonfat spreads of the prior art.

Still further, the compositions of the present invention exhibit improved heat stability during other high heat applications such as frying. In this regard, they do not immediately liquify and flow across the frying pan as do commercial low fat and nonfat spreads of the prior art, but rather slowly melt in a manner similar to full fat spreads.

The invention accordingly pertains to low fat or nonfat margarines and butter spreads having a softening point of at least about 115° F.

The invention also pertains to low fat and nonfat margarines and butter spreads which are essentially polyglyceride free.

The invention additionally pertains to low fat and nonfat margarines and butter spreads which are essentially gelatin free.

The invention yet further pertains to low fat and nonfat margarines and butter spreads which are fat discontinuous.

The invention still additionally pertains to low fat and nonfat margarines and butter spreads comprising a thickening agent having a softening point of at least about 115° F., and an emulsion which itself comprises at least one fat and water.

The invention also pertains to compositions, particularly food compositions, more particularly edible spreads—and in accordance with the foregoing, as a matter of particular preference low fat and nonfat spreads and margarines—having a softening point of at least about 115° F., and comprising an emulsion and a chemically set gel. The emulsion comprises a fat and water. The chemically set gel comprises a carbohydrate. Preferably, the carbohydrate is a cationically crosslinkable carbohydrate. Also preferably, the chemically set gel comprises a cationically crosslinked gel. Most preferably, the chemically set gel further comprises—in addition to the carbohydrate—water and a gel inducing cation.

The invention also pertains to processes for preparing a compositions—again, particularly food compositions, more particularly edible spreads, and as a matter of particular preference low fat and nonfat spreads and margarines. Also as a matter of preference the compositions prepared by the processes of the invention have a softening point of at least about 115° F. The processes comprise mixing a chemically set gel comprising a carbohydrate, as discussed, and an emulsion which itself comprises water and at least one fat which has a melting point of at least about 115° F., and which also is an emulsifier.

DESCRIPTION OF THE INVENTION

Figure 1:
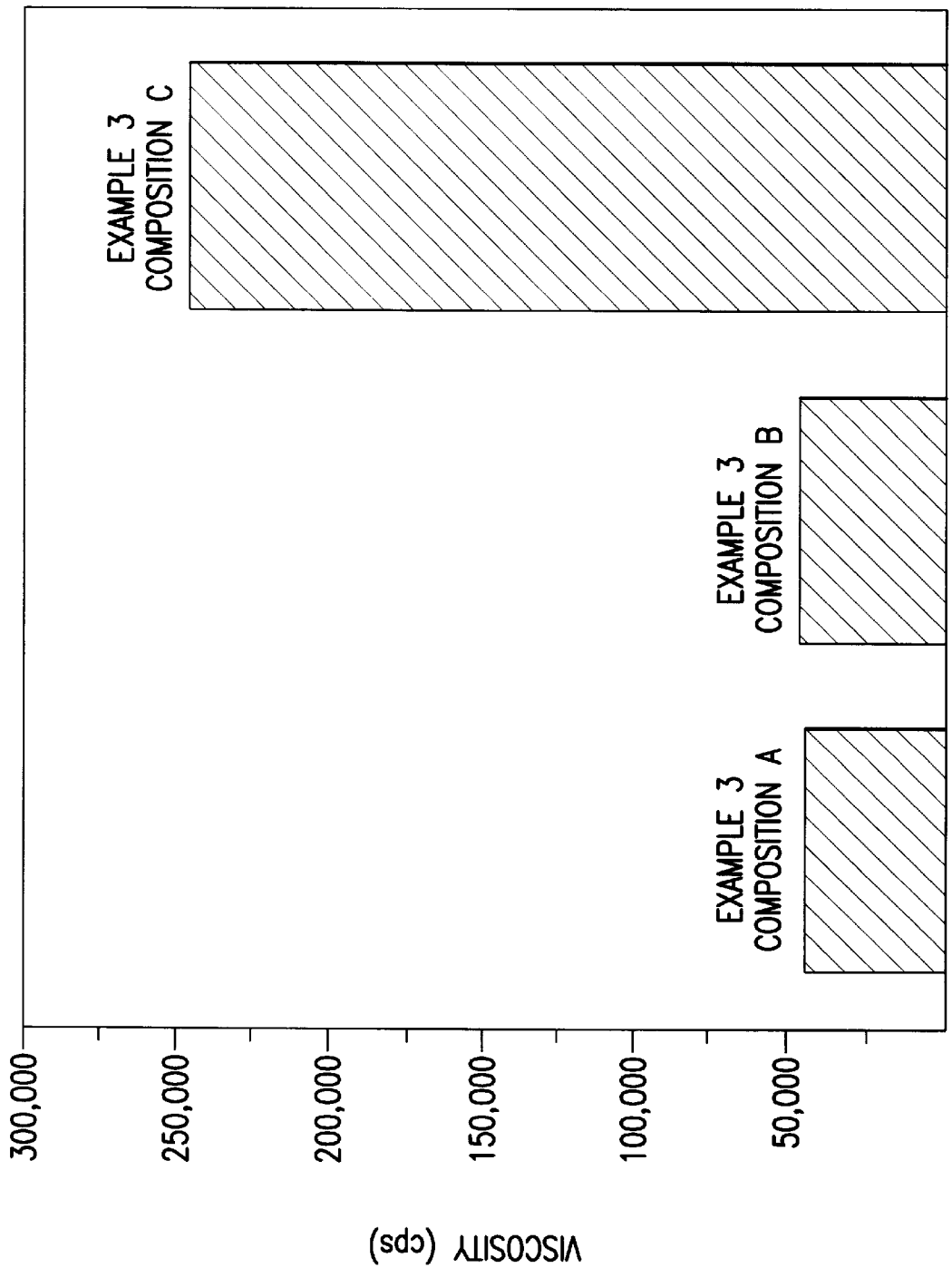
FIG. 1 shows the viscosities of different nonfat compositions—including a nonfat composition of the invention—with reference to their suitability as spreads.

As used herein, the term "non-fat" is intended to mean less than about 3.5% by weight fat. The term "low-fat" is intended to mean less than about 22% by weight fat. Fat content is measured by methods of the Association of Official Analytical Chemists (AOAC), 13th edition (1980).

Softening points, as referred to herein, are determined with reference to the property of elastic modulus (G'). In this regard, the softening point is defined as the temperature at which a 70 percent decrease in G' is obtained, relative to the initial G' at 68° F. G' is measured using a controlled stress rheometer such as a Bohlin VOR Rheometer or equivalent.

Melting points, as referred to herein, are determined by the Wiley Melting Point Method as generally understood in the art.

The compositions of the invention include food compositions, and among the food compositions of the invention are edible spreads. Suitable edible spreads include, by way of example, margarines, butter spreads, peanut butter spreads, mayonnaises, chocolate spreads, cheese spreads, dairy spreads such as cream cheeses, fruit based spreads such as jams and jellies, non-dairy spreads, and pate spreads.

Preferred spreads of the invention are nonfat and low fat spreads. Of the nonfat and low fat spreads, nonfat margarine, low fat margarine, nonfat butter spread, and low fat butter spread are particularly preferred.

The compositions of the present invention preferably are gelatin free, or at least essentially gelatin free. As used herein, "essentially gelatin free" means less than about 2 percent by weight polyglyceride, more preferably less than about 1 percent by weight polyglyceride, and still more preferably less than about 0.5 percent by weight gelatin.

Also as a matter of preference the compositions of the invention are fat discontinuous. As used herein, "fat discontinuous" means that there is no recognizable continuous fat phase present.

The compositions of the present invention additionally are preferably heat stable, and preferably have a softening point of at least about 115° F. In this regard, the term "heat stable", as used herein in conjunction with a material, means that the material has a melting point of at least about 115° F.

More preferably, the compositions of the invention have a softening point of at least about 120° F.; still more preferably, of at least about 125° F.; still more preferably, of at least about 130° F.; still more preferably, of at least about 135° F.; and still more preferably, of at least about 140° F. With respect to an upper limit, particularly for the spreads of the invention, the composition softening point may be at any level at which the composition retains the known properties of spreads (e.g., spreadability and desired organoleptic properties). It is believed that a practical upper limit would be that of typical baking temperatures, such as about 500° F. A more preferred upper limit would be about 375° F.; more preferably, about 250° F.; and still more preferably, about 212° F. The most preferred upper limit would be about 160° F.

Compositions of the invention preferably include at least one fat. One purpose served by the fat component is to provide an unctuous feel to these compositions. Appropriate fats include the edible fats and oils in general, as these are known in the art. The monoglycerides and the polyglycerides—i.e., the diglycerides and triglycerides—alone or in combination, are generally suitable.

Preferred fats are those which are also emulsifiers. These include diglycerides derived from saturated fatty acids, from unsaturated fatty acids, and from combinations thereof—i.e., the saturated and unsaturated diglycerides. These also include monoglycerides derived from both saturated and unsaturated fatty acids—i.e., the saturated and unsaturated monoglycerides.

Of the foregoing, the indicated saturated and unsaturated monoglycerides are more preferred. In this regard, as a matter of preference the compositions of the invention—particularly the food compositions, more particularly the edible spreads, and as a matter of particular preference the low fat and nonfat margarines and butter spreads—are polyglyceride free (i.e., the fat component consists of one or more monoglycerides), or at least essentially polyglyceride free. As used herein, "essentially polyglyceride free" means less than about 2 percent by weight polyglyceride, more preferably less than about 1 percent by weight polyglyceride, and still more preferably less than about 0.5 percent by weight polyglyceride.

The saturated and unsaturated glycerides, particularly the monoglycerides, which may be used include those which are esters of the $C_4$–$C_{24}$, and more preferably the $C_{14}$–$C_{18}$, saturated and unsaturated fatty acids. The fatty acids can be from natural and/or synthetic sources and—in accordance with the foregoing—they can be fully or partially hydrogenated.

Suitable saturated glycerides, particularly the monoglycerides, include those derived from the butanoic, hexanoic, octanoic, decanoic, dodecanoic, tetradecanoic, hexadecanoic, octadecanoic, and arachidic acids, and combinations thereof; the hydrogenated fatty acids derived from soybean, corn, and palm oil are examples of the saturated fatty acids which may be used. Suitable unsaturated glycerides, particularly monoglycerides, include those derived from the 9-hexadecenoic, 9-octadecenoic, 9,12-octadecadienoic, 9,12,15-octadecatrienoic, 5,8,11, 14-eicosatetraenoic, and 13-docosenoic acids.

Particularly preferred fats are those which not only are also emulsifiers, but yet additionally are heat stable, within the meaning as set forth herein—i.e., having a melting point of at least about 115° F. More preferably, these particularly preferred fats have a melting point of at least about 120° F.; still more preferably, of at least about 125° F.; still more preferably, of at least about 130° F.; still more preferably, of at least about 135° F.; and still more preferably, of at least about 140° F. The melting point upper limit for the fats of the invention may be at any level at which the compositions wherein they are incorporated retain the known properties of spreads, as indicated (e.g., spreadability and desired organoleptic properties).

Fats which are suitable as these particularly preferred fats of the invention include the saturated monoglycerides, as discussed above. Of the saturated monoglycerides, distilled saturated monoglycerides are especially preferred.

A commercially available distilled saturated monoglyceride composition which can be used is Myverol 18-06, from Eastman Chemical Co., Kingsport, Tenn. This composition comprises at least about 90 percent by weight monoglyceride, and has a melting point of approximately 156° F.

The fat is preferably present in the compositions of the invention as part of an emulsion; emulsions of the invention are further identified herein as the fat fraction. Most preferably, the emulsions comprises the fat and water. Also as a matter of preference, the emulsions are fat discontinuous—i.e., having no recognizable continuous fat phase.

Where fat which is not also an emulsifier—e.g., one or more triglycerides—is present, compositions of the invention preferably include, in addition to the fat, at least one emulsifier; the purpose of the at least one emulsifier is to stabilize the indicated emulsion. Emulsifiers which may be used include the edible emulsifiers, including both ionic and nonionic edible emulsifiers.

Appropriate emulsifiers include the fats which are also emulsifiers, as discussed herein. Preferred of these are the saturated and unsaturated diglycerides, and the saturated and unsaturated monoglycerides.

Additional suitable emulsifiers include non-fatty carboxylic esters of fatty acid esters, phospholipids, fatty acid esters of polyols and sugars, hydroxycarboxylic acid esters of monoacylglycerols (such as diacetyl tartaric acid anhydride), monoesters of ethylene and propylene glycol, sorbitan fatty acid esters, polyglycerol esters, water soluble gums, sodium stearoyl 2 lactylate, triglycerol monostearate, diacetyl tartaric acid ester of monoglycerides (i.e., DATEM), and lecithins. The indicated fatty acids are preferably the $C_4$–$C_{24}$, and more preferably the $C_{14}$–$C_{18}$ saturated and unsaturated fatty acids; they can be from natural and/or synthetic sources and—in accordance with the foregoing—they be fully or partially hydrogenated.

Yet additional suitable emulsifiers include carbohydrates and proteins which have surface activity. Preferred carbohydrates having surface activity include surface active polysaccharides such as methyl cellulose, hydroxypropyl cellulose, methylhydroxypropyl cellulose, sugar beet pectin, and gum arabic. Preferred proteins having surface activity include milk proteins (e.g., casein and whey), soy protein isolate, egg proteins, proteins isolated from legumes (e.g., peanuts), and proteins isolated from cocoa.

Commercially available forms of lecithin which can be used are Centrolene® A or Centrolene® S, from Central Soya Co., Fort Wayne, Ind. A commercially available form of triglycerol monostearate which can be used is Santone, from Van den Bergh, Lisle, Ill. A commercially available form of DATEM which can be used is Panodan® 150K, from Grindsted Products, Inc., Kansas City, Kans. Commercially available surface active polysaccharides which can be used are Benecel® and Kucel® products, from Hercules Incorporated.

Where the compositions of the invention include at least one fat which is also an emulsifier—whether or not one or more fats which are not emulsifiers are likewise present—then stable emulsions can be provided without the presence of a further emulsifier; accordingly, in such instance a further emulsifier is not required. However, even where one or more fats which are also emulsifiers are present, as a matter of preference at least one additional emulsifier, or coemulsifier, is also included; in this regard, the term "coemulsifier" is used to identify emulsifiers employed in conjunction with one or more fats which are also emulsifiers.

Specifically, where a coemulsifier is used it helps the emulsion to bind more water, and appears to provide a smoother mixture in the emulsion between the fat and water. In this regard, the presence of a coemulsifier is thought to further stabilize the emulsion, and therefore the composition of the invention; it likewise can increase the viscosity of the finished product.

Particularly, where coemulsifier is omitted, the product does not appear as smooth. Including coemulsifier gives the composition of the invention more shine; it results in a more oily unctuous appearance, and therefore a more appealing appearance.

The emulsifiers as discussed herein are also appropriate as coemulsifiers for the compositions of the invention. In this regard, fats which are also emulsifiers—e.g., the saturated and unsaturated monoglycerides and the saturated and unsaturated diglycerides—may be employed as coemulsifiers.

The emulsions of the present invention can be prepared by combining—e.g., mixing or blending—the water, fat, whatever emulsifiers are employed (including fats which are also emulsifiers, and also including coemulsifiers), and a base; the preferred bases include sodium and/or potassium hydroxide. The amount of base used is preferably that which is sufficient to neutralize a substantial proportion—as a matter of particular preference, at least about 50 percent—of whatever free fatty acids are present; in this regard, free fatty acids can be present in many edible emulsifiers, such as monoglycerides.

The indicated neutralization of the free fatty acids allows for maximum entrapment of the water, and therefore increases the swelling of the fat particles in the emulsion. Accordingly, neutralization of the free fatty acids can increase the viscosity of the fat fraction, whereas the fat fraction may lack significant viscosity if the indicated base is not employed to effect this neutralization.

Compositions of the invention—particularly the edible spreads, and most particularly the low fat margarines, the nonfat margarines, the low fat butter spreads, and the nonfat butter spreads—preferably also include a thickening agent. Additionally as a matter of preference, the thickening agent is heat stable—i.e., having a softening point of at least 115° F.

Yet further as a matter of preference, the indicated thickening agent comprises a chemically set gel. Consistent with the foregoing, the chemically set gels of the invention are preferably heat stable—i.e., having a softening point of at least about 115° F.

Corresponding to emulsions of the invention, as noted, being further identified herein as the fat fraction, chemically set gels of the invention are further identified herein as the gum fraction. Compositions of the invention preferably include both the indicated emulsion and a chemically set gel, and preferably comprise blends or mixtures of the emulsion and gel.

Suitable chemically set gels comprise a first carbohydrate and preferably also comprise water. Preferred first carbohydrates of the invention include the cationically crosslinkable carbohydrates, and preferred cationically crosslinkable carbohydrates include the cationically crosslinkable polysaccharides.

Further, the chemically set gels of the invention include rigid gels, preferably cationically crosslinked rigid gels.

The cationically crosslinked gels of the present invention, including the rigid cationically crosslinked gels, comprise a cationically crosslinkable carbohydrate, a suitable gel inducing cation, and a suitable liquid—preferably, water. These gels can be formed by mixing the cationically crosslinkable carbohydrate, cation, and liquid, in proportions effective to form the gels.

The indicated chemical setting of the gels of the invention can be accomplished by cationic crosslinking of the indicated cationically crosslinkable carbohydrate, by which means the carbohydrate forms a salt with a gel inducing cation. In this mechanism, gel inducing cations serve as the crosslinking bridges stabilizing the carbohydrate lattice of the gel structure, thus entrapping the liquid phase.

Further, as discussed herein, it is within the scope of the present invention to subject the chemically set gels of the present invention to agitation and comminution, e.g., in preparation of the edible spreads. Accordingly, the chemically set gels of the present invention include broken gels, as these are commonly understood in the art.

Among the cationically crosslinkable polysaccharides of the present invention are the low methoxyl (LM) pectins, also known in the art as the low Degree of Esterification (low DE) pectins. For the purposes as discussed herein, the LM pectins are understood as being those pectins having a degree of esterification of less than 50 percent. For the purposes of the present invention, the LM pectins preferably have a DE of less than about 40%; more preferably, less than about 30%; and still more preferably, less than about 20%.

Suitable polysaccharides of the present invention also include those high methoxyl (HM) pectins—also known in the art as the high Degree of Esterification (high DE) pectins—which are cationically crosslinkable. For the purposes as discussed herein, the HM pectins are understood as being those pectins having a degree of esterification of at least 50 percent.

Yet additionally among the cationically crosslinkable carbohydrates of the present invention are the amidated pectins, the alginates, the carrageenans, the carboxymethyl celluloses, the gellan gums, agar, and the metal salts of all the aforementioned cationically crosslinkable carbohydrates.

A particularly preferred cationically crosslinkable carbohydrate is the low methoxy pectin which is commercially available as Slendid! product, from Hercules Incorporated, Wilmington, De. Other suitable commercially available cationically crosslinkable carbohydrates are the LC-5, WR-78, and SGP3 carrageenans and CMC 7 H4F carboxymethyl cellulose, all also available from Hercules Incorporated.

The gel inducing cations of the present invention include both monovalent and polyvalent—including divalent and trivalent—cations which are appropriate for forming salts (particularly, edible salts) with cationically crosslinkable carbohydrates. Examples of gel inducing cations which may be used include calcium, magnesium, sodium, potassium, ammonium, aluminum, ferrous, ferric, cuprous, and cupric ions. These cations may be supplied by appropriate nontoxic sources, including the edible salts of these ions. Among the edible salts which may be employed for this purpose are calcium chloride, calcium chloride dihydrate, calcium phosphate, and calcium propionate.

As to what cations may be used with the different cationically crosslinkable carbohydrates, the polyvalent cations are suitable for use—i.e., the requisite crosslinking will be achieved—with all of the cationically crosslinkable carbohydrates; accordingly, of the foregoing specified cations, calcium, magnesium, aluminum, ferrous, ferric, cuprous, and cupric ions may be used with all of the cationically crosslinkable carbohydrates. However, specific carrageenans, including the kappa carrageenans, are crosslinkable by monovalent as well as polyvalent cations; accordingly, of the foregoing specified cations the sodium, potassium, and ammonium ions as well as the indicated polyvalent cations are suitable for particular carrageenans.

Particularly preferred cationically crosslinked gels for the edible spreads of the present invention are the gels containing calcium pectate. In accordance with the foregoing, these can be provided by combination of such low methoxyl pectin with a calcium salt, in an aqueous medium.

Further regarding the gels of the present invention, they are preferably in particulate form, and also as a matter of preference they are provided in irregular shapes, by such means as shredding. A substantial portion of the irregularly shaped gel particles may be described as being elongated, rod-like, ribbon-like, platelets or nonspheroidal. These gel particles appear to be highly associated, i.e., crowded or packed into loosely adhered shapes.

Yet additionally these irregular particles are typically branched and/or elongated, having a length of up to 250 microns, with less than about 3 percent by weight of the gel particles being less than 5 microns in size. Correspondingly, as a matter of preference the longest dimension of the gel particles of the present invention is up to 250 microns; also as a matter of preference, their mean volume diameter is in the range of about 10 microns to about 100 microns, more preferably about 25–75 microns.

Consistent with the foregoing, included among the gels of the present invention are those comprising a substantial portion of irregularly (e.g., nonspheroidally) shaped particles—particularly, carbohydrate gel particles—having a longest axial dimension of up to about 250 microns with a mean volume diameter ranging from about 10 microns to about 100 microns. In this regard, the gels of the present invention can in themselves be fat simulating compositions, accordingly providing fat simulating effect—for instance, in having the substantially smooth organoleptic character of an oil emulsion.

The compositions of the present invention are preferably shear irreversible at temperatures above the melting point of the fat fraction or at temperatures below the gelation temperature of the carbohydrates in the gum fraction. Also as a matter of preference, the emulsions of the present invention and the gels of the present invention are each independently shear irreversible.

The gels can be characterized by viscoelastic properties wherein the elastic (solids) component is termed G' elastic modulus. The measurement of G' can be useful in determining thermal stability and phase transitions, i.e., the softening point, in compositions of the present invention.

Figure 2:
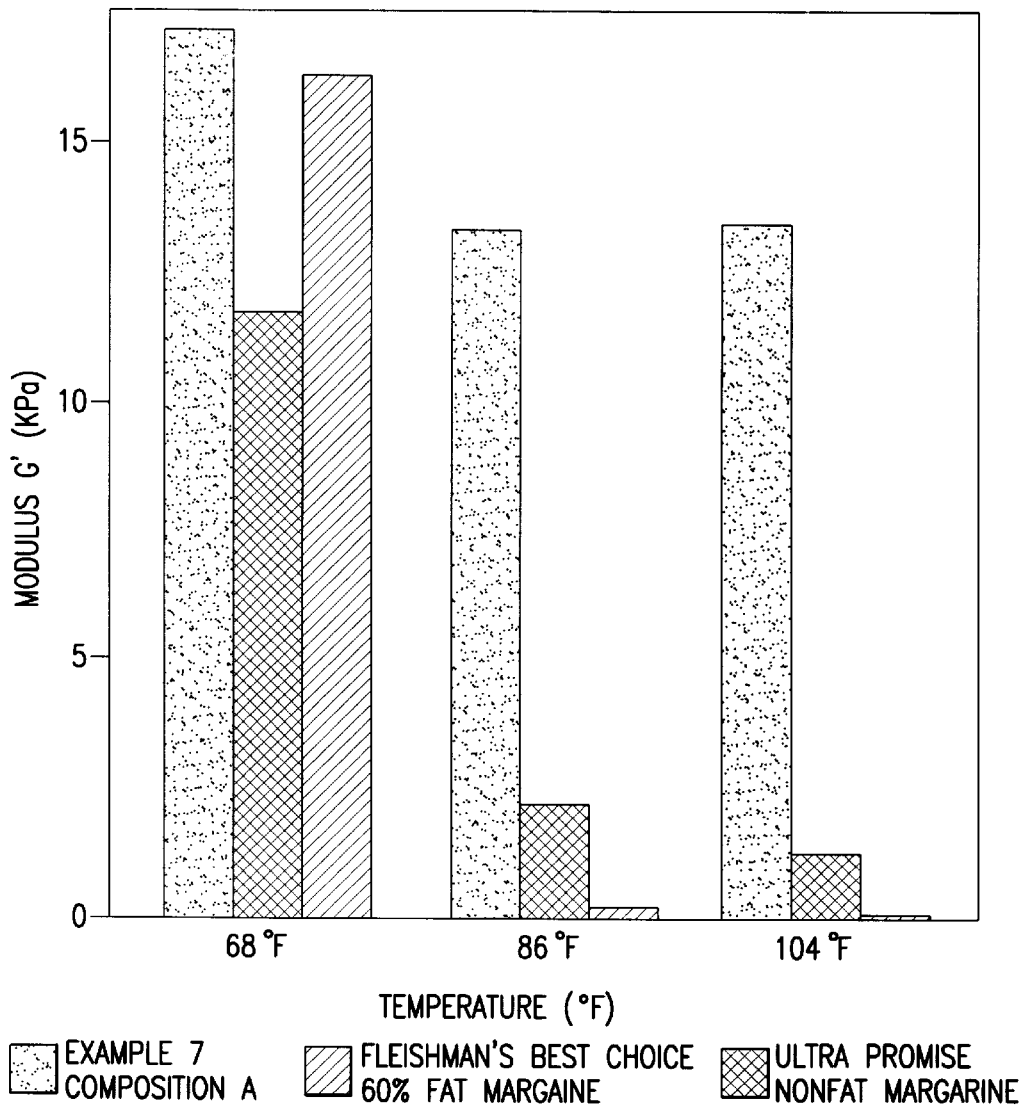
FIG. 2 shows the modulus as measured by G' in Kilo-Pascals (KPa) of different compositions—including a composition of the invention—with respect to temperature.

For example, in accordance with the subsequent discussion herein with respect to FIG. 2, the commercial nonfat product depicted therein exhibits a decreasing elastic modulus as the temperature rises, due to the melting of the gelatin and releasing of free water. In contrast, also consistent with the results shown in FIG. 2, the compositions of the present invention do not show a dramatic decrease in elastic modulus as temperature increases, and accordingly restrict their release of free water and solid material—particularly as to the edible spreads of the invention, they control this release of material into a food to which the spreads are applied.

Preferably, the compositions of the present invention comprise a sufficient amount of water to hydrate the solid components thereof; preferably, the compositions of the invention comprise at least about 20% by weight water. More preferably, the compositions of the invention comprise at least about 50% water; still more preferably at least about 80% by weight water; still more preferably at least about 85 percent; and still more preferably at least about 90 percent by weight water. With respect to an upper limit for compositions of the present invention, particularly for the spreads of the invention, the water content may be at any level at which the composition retains the known properties of spreads (e.g., spreadability and desired organoleptic properties). It is believed that the water content can be as high as about 98% by weight water. A more preferred upper limit can be about 95% by weight water, with the most preferred upper limit being about 90% by weight water. This proportion of water includes the total amount contributed both by the fat fraction and by the gum fraction.

Preferably, the compositions of the present invention comprise a sufficient amount of carbohydrate to retain the known properties of spreads (e.g., spreadability and desired organoleptic properties). Preferably, the compositions of the invention comprise at least about 0.5% by weight carbohydrate. More preferably, the compositions of the invention comprise at least about 1% carbohydrate; still more preferably, at least about 3% by weight carbohydrate; still more preferably, at least about 10% by weight carbohydrate. With respect to an upper limit for compositions of the present invention, particularly for the spreads of the invention, the carbohydrate content may be at any level at which the composition retains the known properties of spreads (e.g., spreadability and desired organoleptic properties). It is believed that the carbohydrate content can be as high as about 80% by weight carbohydrate. A more preferred upper limit can be about 60% by weight carbohydrate, and a still more preferred upper limit can be about 40% by weight carbohydrate, with the most preferred upper limit being about 20% by weight carbohydrate.

Correspondingly, the gum fraction or cationically crosslinked gel of the present invention preferably comprises sufficient carbohydrate to retain the known properties of spreads (e.g., spreadability and desired organoleptic properties). Preferably, the gum fraction comprises at least about 0.5% by weight carbohydrate. More preferably, the gum fraction comprises at least about 1% carbohydrate; still more preferably, at least about 3% by weight carbohydrate; and still more preferably, at least about 15% by weight carbohydrate. With respect to an upper limit for the gum fraction of the present invention, particularly for the spreads of the invention, the carbohydrate content may be at any level at which the composition retains the known properties of spreads (e.g., spreadability and desired organoleptic properties). It is believed that the carbohydrate content can be as high as about 80% by weight carbohydrate. A more preferred upper limit can be about 60% by weight carbohydrate, and a still more preferred upper limit can be about 40% by weight carbohydrate, with the most preferred upper limit being about 20% by weight carbohydrate.

Yet further as a matter of preference, the compositions of the present invention include about 0.05–20 percent by weight of salt(s) providing the gel inducing cation; more preferably, about 0.1 to 10 percent by weight of salt(s); most preferably, about 1 to 5 percent by weight.

The fat content of the compositions of the present invention preferably should be the minimum which retains the known properties of spreads (e.g., spreadability and desired organoleptic properties). Preferably, the fat content is less than about 22 percent by weight fat. More preferably, the compositions of the invention comprise less than about 20 percent by weight fat; still more preferably, less than about 15 percent by weight fat; still more preferably, less than about 10 percent by weight fat; still more preferably, less than about 5 percent by weight fat; and still more preferably, less than about 3.5 percent by weight fat.

The fat content of the compositions of the present invention preferably should be sufficient to retain the known properties of spreads (e.g., spreadability and desired organoleptic properties). Preferably, the compositions of the present invention comprise at least about 0.1% by weight fat. More preferably, the compositions of the invention comprise at least about 0.5% by weight fat; still more preferably, at least about 1.0% by weight fat; and still more preferably, at least about 2.0% by weight fat.

As a preferred aspect of the invention the fat fraction can be prepared with a limited amount of water, so that the gum fraction can be prepared with a relatively greater amount of water. Increasing the amount of water used in preparing the gum fraction facilitates the solvation and mixing of the viscous gum fraction. Accordingly, prior to its combination with the gum fraction, the fat fraction preferably contains less than about 94% by weight water; more preferably, not more than about 88% by weight water; more preferably, not more than about 75% by weight water; and still more preferably, not more than about 50% by weight water.

As to the proportion of fat in the compositions of the present invention—and also, more specifically, in the emulsions of the invention—emulsifiers which are also fats (e.g., saturated monoglycerides, as discussed herein) are also considered in determining this proportion.

Various additional ingredients can be included in the compositions—particularly, the food compositions—of the invention, in proportions as suitable according to the ingredients' purposes. These can be provided with one or both of the fat and gum fractions or they can be added after blending of these fractions—according to the properties of these ingredients and fractions, and/or according to the requirements of the food preparation process.

For instance, one or more second carbohydrates, whether or not cationically crosslinkable, can be provided for such purposes as to provide rheology modification. As an example, carboxymethyl celluloses, besides being useful (with the appropriate polyvalent gel inducing cation, as discussed) as cationically crosslinkable carbohydrates, can instead or also be employed as rheology modifiers, as can carrageenans. Additional suitable rheology modifiers include noncationically crosslinkable pectins (such as the noncationically crosslinkable HM pectins), agars, and maltodextrins.

The carrageenans and agars, including those discussed herein as cationically crosslinkable carbohydrates and as rheology modifiers, are extracts from seaweed, and gel under certain conditions. Different types of carrageenans and agars are soluble under different conditions and give different gel textures; the carrageenans and agars employed to serve the function of rheology modification are chosen to provide an additional stiffness and body to the compositions of the present invention.

Maltodextrins, obtained by hydrolysis of starch polymers, can be employed to provide solids and bulk, and to lower water content. A commercially available maltodextrin which can be used is Frodex 24, from American Maize-Products Company, Hammond, Ind.

Also suitable as a second carbohydrate for the compositions of the present invention is the pectin which is commercially available under the trademark Slendid® 200, also from Hercules Incorporated.

Suitable proteins may also be included. These include milk proteins (e.g., casein and whey), soy protein isolate, egg proteins, proteins isolated from legumes (e.g., peanuts), and proteins isolated from cocoa.

Yet additional ingredients which may be used include flavorants, colorants, preservatives, sodium chloride and other salts, etc., in conventional amounts according to their functions. Suitable colorants include beta carotene— preferably, which is soluble in water—while among the flavorants which may be used are butter spread flavor and lactic acid, and appropriate preservatives include potassium sorbate and sodium benzoate.

The compositions of the present invention can be made by separately preparing the fat and gum fractions, and then combining these fractions.

As to preparation of the fat fraction, the water is rendered basic and heated to less than boiling—most preferably to a temperature of about 131–149° F. with respect to saturated monoglycerides. At this stage the fat is added; then a coemulsifier and any additional ingredients, such as colorants or additional base, are also added.

The resulting mixture is subjected to agitation, and the pH thereof is maintained in the range of about 3.5–8.5. The thusly provided fat fraction may be cooled, but preferably is maintained at a temperature in excess of about 40° F., but not greater than about 149° F.

To prepare the gum fraction the cationically crosslinkable carbohydrate is dispersed in water with high speed agitation; the agitation is continued, and first the gel inducing cation salt then additional ingredients—e.g., rheology modifiers, preservatives, sodium chloride—are added. The resulting mixture is heated to below boiling—preferably in the range of about 140–1760F. Flavoring can be added at this point, and/or earlier with the indicated additional ingredients.

In preparation of the gels of the present invention, suitable mixing, gelling, chopping, and shredding can be employed, to form particles of the desired size and shape. This can be a simple process, from which 100 percent of the product serves as the gel of the present invention; it is not required to use specialized equipment, or complicated processing steps, such as separation, dilution or multiple passing through a shearing device.

Where a chopping step is employed, the gel is chopped into coarse particles in a conventional blender or colloid mill. This step is carried out so that the gel particles are of a suitable size that can be fed to a homogenizer; preferably, the chopping step is conducted so as to form a processable mass comprised of coarse particles of less than 10 mm in size.

The heated fat and gum fractions are then combined at this stage using a low speed mixer. The resulting mixture— maintained at an elevated temperature (e.g., approximately 140° F.)—is then blended using suitable conventional equipment; for instance, the mixture can be sheared with homogenization, or in a colloid mill. Preferably, unequal volumes of the two fractions are thusly combined. In this regard, as a matter of preference the gum fraction (which contains approximately 70 percent of the water) comprises approximately 70 percent by weight or volume of the mixture, and the fat fraction (which contains approximately 30 percent by weight of the water) comprises approximately 30 percent by weight or volume of the mixture.

The thusly blended mixture is then passed through a conventional shearing device (e.g., a homogenizer, rotor-stator, etc.) only once at normal shearing conditions, generally from 1000 to 4000 psig, more preferably 1500 to 3000 psig. When a two stage homogenizer is used, the first stage is operated at a pressure of 500 to 5000 psig, more preferably 1000 to 3000 psig, and the second stage is operated at a pressure of 0 to 700 psig, preferably 300 to 700 psig.

Only one pass through the shearing device, as discussed, is required to produce the desired irregular—e.g., nonspheroidal—gel particles of the gum fraction and to provide for uniform mixing of the gum and fat fractions. Specifically, in this manner the coarse particles of the gum fraction can be sheared or shredded to form irregularly shaped gel particles having a longest axial dimension of up to about 250 microns with a mean volume diameter ranging from about 10 microns to about 100 microns.

The resulting composition of the gum and fat fractions can be packed hot, cooled to below room temperature, and stored at temperatures slightly above freezing.

The present invention is illustrated by the following Examples, which are provided for the purpose of representation, and are not to be construed as limiting the scope of the present invention. Unless stated otherwise, all percentages, parts, etc. are by weight, and viscosity measurements were taken with a Brookfield viscometer.

Preparation of the rat Fraction

For those compositions of the Examples including a fat fraction, this fraction—except where indicated otherwise— was prepared by the following procedure and using the following ingredients, in the indicated ranges by weight:

| | |
|---|---|
| Myverol 18-06 | 5.5–11% |
| DATEM | 0.35–.7% |
| Beta Carotene | 0.05–.1% |
| Sodium Hydroxide | Sufficient to maintain the pH as specified |
| Water | Remainder of the fraction |

The water was brought to a pH of about 9–10 by the addition of sodium hydroxide, and heated to 140° F. The Myverol 18-06 product was added to the resulting basic aqueous medium; then the DATEM product was added, and the pH was maintained at 6–7 with sodium hydroxide. Then the mixture was cooled with agitation to less than 50° F.

EXAMPLE 1

Five different edible spreads A–E of the present invention were prepared, each with a different gum fraction having ingredients and proportions as indicated:

| | A | B | C | D | E |
|---|---|---|---|---|---|
| Slendid ® | 3.4% | 3.4% | 3.4% | 3.4% | 3.4% |
| Calcium Chloride | 0.34% | 0.34% | 0.34% | 0.34% | 0.34% |
| Frodex 24 | 10.0% | 10.0% | 10.0% | 10.0% | 10.0% |
| Butter spread Flavor | 0.2% | 0.2% | 0.2% | 0.2% | 0.2% |
| Potassium Sorbate | 0.2% | 0.2% | 0.2% | 0.2% | 0.2% |
| Sodium Chloride | 2.0% | 2.0% | 2.0% | 2.0% | 2.0% |
| Slendid ® 200 | 0.5% | 0.5% | 0.5% | 0.5% | 0.5% |
| Carrageenan (LC-5) | 0.8% | — | 0.8% | — | — |

-continued

|  | A | B | C | D | E |
|---|---|---|---|---|---|
| Carrageenan (SGP3) | — | — | — | 0.8% | — |
| Carrageenan (J) | — | 0.8% | — | — | 0.8% |
| Carrageenan (WR-78) | — | — | 0.3% | 0.3% | 0.3% |
| Water | 82.56% | 82.56% | 82.26% | 82.26% | 82.26% |
| Viscosity (cps) | 762,000 | 372,000 | 1,094,000 | 1,236,000 | 874,500 |

The Slendid® product was dispersed in the water slowly, using a high speed mixer, followed by the calcium chloride. The rest of the ingredients (except for the carrageenan) were then added. The mixture was heated to ~160° F. and the butter spread flavor was then added.

The fat and gum fractions were blended in a 25:75 ratio by homogenization at 2500 psi, using a Rannie Homogenizer. The resulting products were filled into packages and stored at 41° F.

The compositions varied in smoothness and stiffness depending on the carrageenans used. The presence of Carrageenan WR-78 in spreads C–E significantly increased the viscosity of these spreads, and made them stiffer.

EXAMPLE 2

An edible spread of the present invention was prepared, with the gum fraction having ingredients and proportions as indicated:

| Slendid ® | 3.85% |
|---|---|
| Calcium Chloride | 0.385% |
| Slendid ® 200 | 0.48% |
| Carrageenan (LC-5) | 0.75% |
| Carboxyl methyl cellulose (CMC 7 H4F) | 1.0% |
| Butter spread Flavor | 0.2% |
| Sodium Chloride | 1.5% |
| Potassium Sorbate | 0.1% |
| Sodium Benzoate | 0.1% |
| Water | 91.64% |

Preparation of the gum fraction, blending with the fat fraction, packaging, and storage were effected in the same manner as for the Example 1 products—except that the carrageenan was added before heating of the gum fraction mixture to 150° F.

The resulting composition had good spreading characteristics and a slight "rough" surface, and was determined to have a viscosity of 535,500 cps.

EXAMPLE 3

Three different compositions A–C were prepared with the following gum fractions:

|  | A | B | C |
|---|---|---|---|
| Slendid ® | — | 6.0% | 6.0% |
| CaCl$_2$.2H$_2$O | — | — | 0.3% |
| Lactic Acid | 0.25% | 0.25% | 0.25% |
| Sodium Chloride | 2.0% | 2.0% | 2.0% |
| Potassium Sorbate | 0.26% | 0.26% | 0.26% |
| Water | 97.49% | 91.49% | 91.19% |

Composition A: Nonfat Spread without Cationically Crosslinkable Carbohydrate or Gel Inducing Cation For Composition A, the gum fraction was prepared by dispersion of the lactic acid, sodium chloride, and potassium sorbate in the water. Equal volumes of the fat and gum fractions were blended.

This composition was determined to have a very low viscosity—i.e., 66,000 cps—and a soup or salad dressing-like consistency. Further, fraction separation was observed after storage at 41° F. for twenty four hours.

Composition B: Nonfat Spread with Cationically Crosslinkable Carbohydrate, but without a Gel Inducing Cation The Slendid® product was dispersed in water heated to 158° F., and the remaining ingredients were added to the resulting solution at room temperature. Equal volumes of the fat and gum fractions were blended.

This composition was likewise determined to have a very low viscosity—i.e., 47,200 cps—with a consistency similar to that of Composition A. Fraction separation was observed after storage at 41° F. for twenty four hours.

Composition C: Nonfat Spread with Both Cationically Crosslinkable Carbohydrate and Gel Inducing Cation The Slendid® product, sodium chloride, and potassium sorbate were dispersed in water. The calcium chloride was then added, and an increase in viscosity was observed. Equal volumes of the fat and gum fractions were blended at high speed in a mini-blender jar.

The resulting composition of the present invention had a viscosity of 264,000 cps. Fraction separation was not observed at 41° F.

FIG. 1, in accordance with the previous discussion thereof, comparatively shows the viscosities of the indicated Compositions A–C. The values depicted in this graph demonstrate the significance of the chemically set gel component of the compositions of the present invention.

In this regard, both Compositions A and B, lacking a chemically set gel component (the former because it lacks a cationically crosslinkable carbohydrate, the latter because it lacks such a carbohydrate as well as a gel inducing cation), are characterized by very low viscosities, are not acceptable as spreads. In contrast, Composition C, including both a cationically crosslinkable carbohydrate and a gel inducing cation, has a significantly higher viscosity, and is acceptable as a spread.

These data accordingly demonstrate the importance of the presence of a cationically crosslinkable carbohydrate. They further show the importance of a gel inducing cation being present, in addition to the cationically crosslinkable carbohydrate—i.e., as can be seen from Composition B, where there is a cationically crosslinkable carbohydrate without a gel inducing cation, the viscosity of the resulting product is unacceptably low.

EXAMPLE 4

An edible spread of the present invention was prepared with 1.5 percent unstandardized deesterified amidated pectin as the cationically crosslinkable carbohydrate.

In preparation of the gum fraction, the pectin and CaPO$_4$ were dispersed in water heated to 167° F., and 2 percent salt was added to the resulting gel at room temperature. Equal volumes of the fat and gum fractions, together with 1.5 ml dilute lactic acid (1:10) and butter spread flavor were blended in a mini-blender jar at high speed.

The resulting product was a soft, margarine-like composition at 5.3 pH. The initial spreadability was excellent.

However, after twenty four hours at 41° F., the composition was characterized by a more cohesive matrix; though still spreadable and acceptable as a composition of the invention, and though still cuttable, it exhibited an increased deformability and appurtenant resistance to cutting.

EXAMPLE 5

For each of the following edible spreads A and B of the present invention, the fat fraction did not contain DATEM product, or any other coemulsifier, but was otherwise the same as the fat fractions of the compositions in the previous Examples.

The gum fractions of these edible spreads were as follows:

|  | A | B |
| --- | --- | --- |
| Slendid ® | 4.6% | 4.6% |
| Carrageenan (LC-5) | 0.8% | 0.8% |
| Tapioca Starch | 3.0% | 3.0% |
| Frodex 24 | 6.9% | 6.9% |
| Calcium Chloride | 0.3% | 0.3% |
| Calcium phosphate, dibasic | — | 0.3% |
| Sodium Chloride | 1.0% | 1.0% |
| Butter spread Flavor | 0.2% | 0.2% |
| Potassium Sorbate | 0.2% | 0.2% |
| Water | 83.0% | 83.0% |

In preparation of the gum fraction for Composition A, the Slendid® product and carrageenan were dispersed in water heated to 176° F.; the Frodex 24 product, tapioca starch, butter spread flavor, potassium sorbate, sodium chloride, and calcium chloride were then added. Equal volumes of the fat and gum fractions were blended, and the resulting product was packaged. This spread had a mayonnaise-like consistency, and a viscosity of 244,800 cps.

With respect to Composition B, the Slendid® product, carrageenan, and Frodex 24 were dispersed in water, while the potassium sorbate, sodium chloride and CaPO$_4$ dibasic were added to the fat fraction. As with Composition A, equal volumes of the fat and gum fractions were blended, and the resulting product was packaged.

Initially this spread also had a soft mayonnaise-like texture but became stiffer with time. Its viscosity was 439,000 cps.

EXAMPLE 6

Each of the following edible spreads A and B of the present invention includes protein from a dairy source.

The gum fractions of these spreads were as follows:

|  | A | B |
| --- | --- | --- |
| Slendid ® | 6.0% | 6.0% |
| Calcium Chloride | 0.1% | 0.2% |
| Butter spread Flavor | 0.2% | 0.2% |
| Potassium Sorbate | 0.2% | 0.2% |
| Sodium Chloride | 2.0% | 2.0% |
| Slendid ® 200 | 0.5% | 0.5% |
| Carrageenan (WR-78) | 0.1% | — |
| Carrageenan (SGP3) | — | 0.8% |
| Skim Milk | 72% | 72% |
| Water | 18.9% | 18.1% |

In preparation of the gum fraction for Composition A, the skim milk was heated to 140° F., and the calcium chloride was then added. The Slendid® and the Slendid® 200 products were dispersed slowly in the water, using a high speed mixer, and this dispersion was added to the mixture of skim milk and calcium chloride. The resulting composition was heated to 158° F., and the Carrageenan (WR-78), potassium sorbate, sodium chloride, and butter spread flavor were then added.

The fat and gum fractions were blended in a 30:70 ratio by homogenization at 2500 psi, using a Rannie Homogenizer. The resulting product was packaged and stored at 40° F.

With respect to Composition B, the skim milk was heated to 140° F.; the calcium chloride was then added thereto, followed by the Carrageenan (SGP3). The Slendid® and the Slendid® 200 products were dispersed slowly in the water, using a high speed mixer, and this dispersion was added to the skim milk, calcium chloride, and carrageenan mixture. The resulting composition was heated to 158° F., and the potassium sorbate, sodium chloride, and butter spread flavor were then added.

The fat and gum fractions were blended in a 30:70 ratio by homogenization at 2500 psi, using a Rannie Homogenizer. The resulting product was packaged and stored at 40° F.

EXAMPLE 7

An edible spread A of the invention was prepared from the following gum fraction:

| Slendid ® | 3.4% |
| --- | --- |
| Calcium Chloride | 0.34% |
| Frodex 24 | 10.0% |
| Butter spread Flavor | 0.2% |
| Potassium Sorbate | 0.2% |
| Sodium Chloride | 2.0% |
| Slendid ® 200 | 0.5% |
| Carrageenan (LC-5) | 0.8% |
| Carrageenan (SGP3) | — |
| Carrageenan (J) | — |
| Carrageenan (WR-78) | 0.3% |
| Water | 82.56% |

The Slendid® product was dispersed in the water slowly, using a high speed mixer, followed by the calcium chloride. The rest of the ingredients (except for the carrageenan) were then added. The mixture was heated to ~160° F., and the butter spread flavor was then added. The fat and water fractions were blended in a 30:70 ratio by homogenization at 2500 psi, using a Rannie Homogenizer. The resulting products were filled into packages and stored at 41° F.

FIG. 2, in accordance with the previous discussion thereof, comparatively shows the modulus—as measured by G' in kilopascals—of three different spreads, with respect to temperature. The indicated three spreads are as follows: the foregoing composition A of the invention, a commercial nonfat margarine utilizing gelatin as the thickening agent, (i.e. Ultra Promise® Nonfat margarine) and a commercial full fat—i.e., 60% fat margarine (Fleishman's Best Choice), with respect to temperature.

The values depicted in FIG. 2 demonstrate the thermal stability of the compositions of the present invention, relative to that of both gelatin-based nonfat margarines and full fat spreads. In this regard, as can be seen from FIG. 2, the gelatin-based nonfat margarine and full fat spread shown therein, both lacking a chemically set gel component, are characterized by low modulus values at temperatures of 86°

F. or higher; this temperature is in excess of their softening point. In contrast, Composition A of the present Example still retains significant modulus even at 104° F., indicating that it has not reached its softening point at this temperature.

As to the gelatin based spreads, a low modulus at temperatures in excess of 86° F. has been considered desirable in the art, for the purpose of assisting these spreads to mimic full fat margarines, which melt at temperatures slightly above room temperature. This property is discussed in the prior art, with respect to the gelatin based spreads. However, as noted herein, the gelatin-based spreads are further characterized by the undesirable properties of water release and phase separation at elevated temperatures.

In contrast, the compositions of the invention retain significant modulus at temperatures in excess of 104° F. For instance, the indicated Composition A has a modulus value of 6.1 KPa at 115° F.—accordingly demonstrating that this composition has not reached its softening point even at this temperature. Thusly, having high modulus values at temperatures of at least 115° F., the compositions of the invention do not exhibit the disadvantageous water release and phase separation which characterize prior art spreads, as noted, at elevated temperatures.

The modulus values of these Example 7 compositions, together with the viscosities obtained for the compositions of Example 3, demonstrate the significance of the presence of a chemically set gel for providing a modulus which is appropriate not only at low temperatures, but also at the elevated temperatures characteristic of hot food items.

EXAMPLE 8

Edible spreads A—G of the invention were prepared with the same gum fraction as that of Composition A in Example 1, but with the following different fat fractions:

|  | A | B | C | D | E | F | G |
|---|---|---|---|---|---|---|---|
| Myverol 18-06 | 5.5% | 5.5% | 5.5% | 5.5% | 5.5% | 5.5% | 5.5% |
| Beta Carotene | .05% | .05% | .05% | .05% | .05% | .05% | .05% |
| Centrolex ® R | .35% | | | | | | |
| Centrolene ® A | | .35% | | | | | |
| Centrolene ® S | | | .35% | | | | |
| Centromix ® CPS | | | | .35% | | | |
| Centrosol ® | | | | | 35% | | |
| Actiflo | | | | | | 35% | |
| Santone | | | | | | | .35% |
| Sodium Hydroxide to maintain pH as specified | | | | | | | |
| Water reminder of fraction | | | | | | | |
| Viscosity (1000 cps) | 321 | 300 | 353 | 307 | 238 | 256 | 277 |

EXAMPLE 9

An edible spread of the invention was prepared from the following fat and gum fractions:

| Fat Fraction | |
|---|---|
| Water | 26.16% |
| Myverol 1806 | 3.3% |
| Lecithin Centolene S | 0.21% |
| Beta-Carotene (1% CWS) | 0.03% |
| 4% NaOH | 0.3% |
| Gum Fraction | |
| Water | 57.15% |
| Slendid ® | 2.39% |
| Calcium Chloride | 0.24% |
| Slendid ® 200 | 0.35% |
| Carrageenan (LC-5) | 0.56% |
| Carrageenan (WR-78) | 0.21% |
| Frodex 24 | 7.0% |
| Potassium Sorbate | 0.14% |
| Titanium Dioxide | 0.42% |
| Sodium Chloride | 1.4% |
| Butter spread Flavor | 0.14% |

For preparation of the fat fraction, the water was brought to a pH of about 9–10 by addition of the sodium hydroxide, and then heated to 140° F. The Myverol 18-06 product was added to the resulting basic aqueous medium; then the Centrolene® S product was added. Temperature was maintained at 140° F.; correspondingly, the pH was maintained at 6–7, by addition of sodium hydroxide as needed.

To obtain the gum fraction, the Slendid® product was dispersed in the water slowly, using a high speed mixer, followed by the calcium chloride. The rest of the ingredients, except for the butter spread flavor, were then added. The resulting mixture was heated to ~170° F., and finally the butter spread flavor was added.

The mixtures from part A and B were blended in a 25:75 ratio by homogenization at 2500 psi, using a Rannie Homogenizer. The resulting product was packaged and stored at 41° F.

Finally, although the present invention has been described with reference to particular means, materials, and embodiments, it should be noted that the present invention is not limited to the particulars disclosed, and extends to all equivalents within the scope of the claims.

What is claimed is:

1. A low fat or nonfat margarine or butter spread having a softening point of at least about 115° F. comprising said lowfat or nonfat margarine or buffer spread that is fat discontinuous and has
   (a) at least one fat and water and
   (b) a chemically set gel comprising a cationically crosslinkable carbohydrate.

2. The low fat or nonfat margarine or butter spread of claim 1 which is a low fat margarine spread.

3. The low fat or nonfat margarine or butter spread of claim 1 which is a nonfat margarine spread.

4. The low fat or nonfat margarine or butter spread of claim 1 having a softening point of at least about 120° F.

5. The low fat or nonfat margarine or butter spread of claim 4 having a softening point of at least about 140° F.

6. The low fat or nonfat margarine or butter spread of claim 1 which is essentially gelatin free.

7. The low fat or nonfat margarine or butter spread of claim 1 which is essentially polyglyceride free.

8. The low fat or nonfat margarine or butter spread of claim 1 wherein the at least one fat is also an emulsifier.

9. The low fat or nonfat margarine or butter spread of claim 8 wherein the at least one fat has a melting point of at least about 115° F.

10. The low fat or nonfat margarine or butter spread of claim 9 wherein the at least one fat comprises at least one member selected from the group consisting of saturated monoglycerides.

11. The low fat or nonfat margarine or butter spread of claim 10 wherein the chemically set gel has a softening point of at least about 115° F.

12. The low fat or nonfat margarine or butter spread of claim 11 wherein the chemically set gel comprises a cationically crosslinked gel comprising water, the cationically crosslinkable carbohydrate, and a gel inducing cation.

13. The low fat or nonfat margarine or butter spread of claim 12 wherein the cationically crosslinkable carbohydrate comprises at least one member selected from the group consisting of pectins, alginates, kappa carrageenans, iota carrageenans, carboxymethyl celluloses, and gellan gums.

14. The low fat or nonfat margarine or butter spread of claim 13 wherein the gel inducing cation comprises at least one member selected from the group consisting of calcium, magnesium, sodium, potassium, ammonium, aluminum, ferrous, ferric, cuprous and cupric ions.

15. The low fat or nonfat margarine or butter spread of claim 14 wherein the cationically crosslinkable carbohydrate comprises a low methoxyl pectin, and the gel inducing cation comprises a calcium ion.

16. The low fat or nonfat margarine or butter spread of claim 1 comprising
    (a) an emulsion, and
    (b) a chemically set gel comprising a cationically crosslinkable carbohydrate.

17. The low fat or nonfat margarine or butter spread of claim 16 wherein the emulsion comprises at least one fat and water.

18. The low fat or nonfat margarine or butter spread of claim 17 wherein the at least one fat is also an emulsifier.

19. The low fat or nonfat margarine or butter spread of claim 18 wherein the at least one fat has a melting point of at least about 115° F.

20. The low fat or nonfat margarine or butter spread of claim 19 wherein the at least one fat comprises at least one member selected from the group consisting of saturated monoglycerides.

21. The low fat or nonfat margarine or butter spread of claim 20 wherein the chemically set gel has a softening point of at least about 115° F.

22. The low fat or nonfat margarine or butter spread of claim 21 wherein the chemically set gel comprises a cationically crosslinked gel comprising water, the cationically crosslinkable carbohydrate, and a gel inducing cation.

23. The low fat or nonfat margarine or butter spread of claim 22 wherein the cationically crosslinkable carbohydrate comprises at least one member selected from the group consisting of pectins, alginates, kappa carrageenans, iota carrageenans, carboxymethyl celluloses, and gellan gums.

24. The low fat or nonfat margarine or butter spread of claim 23, wherein the gel inducing cation comprises at least one member selected from the group consisting of calcium, magnesium, sodium, potassium, ammonium, aluminum, ferrous, ferric, cuprous and cupric ions.

25. The low fat or nonfat margarine or butter spread of claim 24 wherein the cationically crosslinkable carbohydrate comprises a low methoxyl pectin, and the gel inducing cation comprises a calcium ion.

26. The low fat or nonfat margarine or butter spread of claim 1 comprising:
    (a) an emulsion comprising at least one fat and water; and
    (b) a thickening agent having a softening point of at least about 115° F.

27. The low fat or nonfat margarine or butter spread of claim 26 which is a low fat margarine.

28. The low fat or nonfat margarine or butter spread of claim 26 which is a nonfat margarine.

29. The low fat or nonfat margarine or butter spread of claim 26 wherein the at least one fat is also an emulsifier.

30. The low fat or nonfat margarine or butter spread of claim 29 wherein the at least one fat has a melting point of at least about 115° F.

31. The low fat or nonfat margarine or butter spread of claim 30 wherein the at least one fat comprises at least one member selected from the group consisting of saturated monoglycerides.

32. A food composition having a softening point of at least about 115° F. and comprising said food composition that is fat discontinuous and has
    (a) an emulsion comprising at least one fat and water and
    (b) a chemically set gel comprising a cationically crosslinkable carbohydrate.

33. The composition of claim 32 wherein the at least one fat has a melting point of at least about 115° F.

34. The food composition of claim 32 having a softening point of at least about 120° F.

35. The food composition of claim 34 having a softening point of at least about 140° F.

36. The food composition of claim 32 wherein the chemically set gel comprises a substantial portion of nonspheroidally shaped particles, the particles having a longest axial dimension of up to about 250 microns with a mean volume diameter ranging from about 10 microns to about 100 microns.

37. The food composition of claim 32 comprising an edible spread.

38. The edible spread of claim 37 which is a low fat edible spread.

39. The edible spread of claim 37 which is a nonfat edible spread.

40. The edible spread of claim 37 wherein the at least one fat is also an emulsifier.

41. The edible spread of claim 40 wherein the at least one fat has a melting point of at least about 115° F.

42. The edible spread of claim 41 wherein the at least one fat comprises at least one member selected from the group consisting of saturated monoglycerides.

43. The edible spread of claim 42 further comprising a coemulsifier.

44. The edible spread of claim 43 wherein the coemulsifier comprises at least one member selected from the group consisting of diacetyl tartaric acid ester of monoglycerides, lecithins, and triglycerol monostearate.

45. The edible spread of claim 42 wherein the chemically set gel has a softening point of at least about 115° F.

46. The edible spread of claim 45 wherein the chemically set gel comprises a cationically crosslinked gel comprising water, the rationally crosslinkable carbohydrate, and a get inducing cation.

47. The edible spread of claim 46 wherein the cationicaliy crosslinkable carbohydrate comprises at least one member selected from the group consisting of pectins, alginates, kappa carrageenans, iota carrageenans, carboxymethyl celluloses, and gellan gums.

48. The edible spread of claim 47 wherein the gel inducing cation comprises at least one member selected from the group consisting of calcium, magnesium, sodium, potassium, ammonium, aluminum, ferrous, ferric ions, cuprous and cupric ions.

49. The edible spread of claim 48 wherein the cationically crosslinkable carbohydrate comprises a low methoxyl pectin, and the gel inducing cation comprises a calcium ion.

50. The edible spread of claim 49 further comprising a second carbohydrate.

51. A process for preparing a food composition, the process comprising mixing
   (a) an emulsion comprising
      (i) water, and
      (ii) at least one fat which is also an emulsifier, and which has a melting point of at least about 115° F. and
   (b) a chemically set gel comprising a cationically crosslinkable carbohydrate to prepare a low or nonfat margarine or butter spread having a softening point of at least 115° F. that is fat discontinuous.

52. The process of claim 51 wherein the mixing comprises homogenization.

53. The process of claim 51 wherein the at least one fat comprises at least one member selected from the group consisting of saturated monoglycerides.

54. The process of claim 51 wherein the chemically set gel comprises a cationically crosslinked gel prepared by mixing the cationically crosslinkable carbohydrate, water, and a gel inducing cation.

55. The process of claim 54 wherein the cationically crosslinkable carbohydrate comprises at least one member selected from the group consisting of pectins, alginates, kappa carrageenans, iota carrageenans, carboxymethyl celluloses, and gellan gums, and wherein the gel inducing cation comprises at least one member selected from the group consisting of calcium, magnesium, sodium, potassium, ammonium, aluminum, ferrous, ferric, cuprous and cupric ions.

56. The process of claim 55 wherein the cationically crosslinkable carbohydrate comprises a low methoxyl pectin and the cation comprises a calcium ion, the step of preparing the cationically crosslinked gel comprising reacting the low methoxyl pectin and a calcium salt in an aqueous medium.

57. The process of claim 54 further comprising the step of preparing the emulsion by mixing the first component, water, and sufficient sodium hydroxide to maintain the emulsion at a pH of about 3.5 to 8.5.

* * * * *